(12) United States Patent
Martin et al.

(10) Patent No.: US 8,968,854 B2
(45) Date of Patent: Mar. 3, 2015

(54) RESIN PANELS WITH LARGE DECORATIVE OBJECTS AND METHODS OF MAKING SAME

(75) Inventors: Guillaume Martin, Rochetoirin (FR); Charles H. Moore, Salt Lake City, UT (US); Matthew T. Sutton, Salt Lake City, UT (US)

(73) Assignee: 3form, LLC, Salt Lake City, UT (US)

( * ) Notice: Subject to any disclaimer, the term of this patent is extended or adjusted under 35 U.S.C. 154(b) by 351 days.

(21) Appl. No.: 13/468,633

(22) Filed: May 10, 2012

(65) Prior Publication Data

US 2012/0288694 A1 Nov. 15, 2012

Related U.S. Application Data

(60) Provisional application No. 61/486,139, filed on May 13, 2011.

(51) Int. Cl.
*B32B 3/02* (2006.01)
*B32B 21/08* (2006.01)
*B32B 7/00* (2006.01)
*B32B 3/08* (2006.01)
*B32B 27/08* (2006.01)

(52) U.S. Cl.
CPC . *B32B 3/08* (2013.01); *B32B 27/08* (2013.01); *B32B 2307/412* (2013.01)

USPC ................................ 428/55; 283/72; 428/54

(58) Field of Classification Search
CPC .............. B32B 3/02; B32B 21/08; B32B 7/00
USPC ......................................... 428/55, 54; 283/72
IPC ..................................... B32B 3/02, 21/10, 7/00
See application file for complete search history.

(56) References Cited

U.S. PATENT DOCUMENTS 4,298,217 A * 11/1981 Moraw et al. ................. 283/108

* cited by examiner

*Primary Examiner* — Brent O'Hern
(74) *Attorney, Agent, or Firm* — Workman Nydegger

(57) ABSTRACT

Implementations of the present invention relate to systems, methods, and apparatus for manufacturing aesthetically pleasing architectural resin panels having a thick three-dimensional interlayer. In particular, at least one implementation includes a layup assembly that includes a decorative interlayer, positioned between resin sheets, that decorative interlayer comprising one or more three-dimensional decorative objects and one or more resin blocks. At least one implementation also includes a single-step lamination or pressing process that uses a combination of heat and pressure to melt the resin sheets and the resin blocks together, forming a decorative resin panel which includes the three-dimensional objects.

35 Claims, 8 Drawing Sheets

RESIN PANELS WITH LARGE DECORATIVE OBJECTS AND METHODS OF MAKING SAME

CROSS-REFERENCE TO RELATED APPLICATIONS

This application claims priority to and the benefit of U.S. Provisional Patent Application No. 61/486,139, filed on May 13, 2011, entitled "UNITARY PANELS WITH LARGE DECORATIVE OBJECTS AND METHODS OF MAKING SAME." The entire contents of the aforementioned patent application are incorporated herein by reference.

BACKGROUND OF THE INVENTION

1. The Field of the Invention

This invention relates to apparatus, systems, and methods for fabricating resin panels comprising decorative objects and interlayers, which can serve structural and/or aesthetic purposes.

2. Background and Relevant Art

Recent trends in building design involve adding to or changing the functional and/or aesthetic characteristics of a given structure or design space by mounting one or more decorative panels thereto. This is at least partly since there is sometimes more flexibility with how the panel (or set of panels) is designed, compared with the original structure. Panels formed from resin materials are particularly popular because they tend to be less expensive, in most applications, than materials such as glass or the like, where certain structural, optical, and aesthetic characteristics are desired.

In addition, resin materials tend to be more flexible in terms of manufacture and assembly because they can be relatively easily bent, molded, colored, shaped, cut, and otherwise modified in a variety of different ways. Decorative resins can also provide more flexibility compared with glass and other conventional materials at least in terms of color, degree of texture, gauge, and impact resistance. Additionally, decorative resins have a fairly wide utility since they can include a large variety of colors, images, interlayers, and shapes.

Along these lines, manufacturers commonly fabricate decorative resin panels by embedding non-resin decorative objects between extruded sheets of resin material. To embed decorative objects with resin sheets, manufacturers typically melt two or more resin sheets around the decorative objects using a combination of pressure and heat. The final product therefore typically comprises decorative objects positioned between two viewable surfaces of the final decorative resin panel, through which the decorative object are visible. Manufacturers primarily embed substantially thin or flat "two-dimensional" objects, such as flattened leaves, ferns, papers, cutout designs, fabrics, and so forth within resin panels, due to manufacturing complications that can arise when embedding thicker three-dimensional objects. Thus, a manufacturer's design choices are often limited to substantially flat or thin decorative objects, or using more complicated manufacturing processes.

One manufacturing complication that can arise when embedding thicker three-dimensional objects is a difficulty in obtaining flat and uniform viewable surfaces on the resin panel. In particular, as the resin sheets melt around thicker objects, the molten material fills gaps between the objects, leaving the visible surface bulging or bowing around the objects. Another manufacturing complication that can arise when embedding thicker objects is the crushing and/or flattening of the decorative objects during the pressing process, particularly when the objects are soft or brittle. Manufacturers have attempted to address these problems on one level or another through a multi-step heating and pressing process, which can lead to increased manufacturing cost and time.

BRIEF SUMMARY OF THE INVENTION

Implementations of the present invention solve one or more of the foregoing or other problems in the art with systems, methods, and apparatus configured to embed three-dimensional objects within decorative resin panels. Specifically, one or more implementations comprise a process for creating resin panels that involves positioning one or more resin blocks, in addition to three-dimensional objects, between resin sheets. Such implementations also involve applying a combination of heat and pressure to fuse the resin sheets and the resin blocks together about the three-dimensional objects. One or more implementations of the present invention thereby allow the manufacturing of resin panels that exhibit superior uniform viewable surfaces and that can incorporate thick three-dimensional objects, whether they are hard, compressible, or brittle.

For example, one implementation of a decorative architectural panel has first and second resin sheets. The decorative architectural panel also includes a plurality of discrete decorative objects positioned between the first and second resin sheets. Additionally, the decorative architectural panel includes a plurality of discrete resin blocks positioned about the decorative objects. The discrete resin blocks being positioned between and fused to the first resin sheet and the second resin sheet.

Additionally, a method of manufacturing a decorative resin panel that incorporates three-dimensional objects involves preparing a panel layup assembly. Preparing the panel layup assembly includes positioning one or more three-dimensional decorative objects between a first resin sheet and a second resin sheet, and positioning a plurality of resin blocks between the first resin sheet and the second resin sheet and about the one or more three-dimensional decorative objects. The plurality of resin blocks each have a thickness at least as thick as a thickness of the plurality of three-dimensional objects. The method further involves heating the panel layup assembly thereby fusing the plurality of resin blocks to the first resin sheet and the second resin sheet. The method also involves cooling the panel layup assembly to form the decorative resin panel.

In addition to the foregoing, a panel system includes a first resin sheet, a second resin sheet, and a plurality of discrete resin blocks positioned between the first resin sheet and the second resin sheet. A first side of each discrete resin block abuts against and is fused to the first resin sheet. A second, opposing side of each discrete resin block abuts against and is fused to the second resin sheet. The panel further includes a plurality of three-dimensional objects positioned between the first and second resin sheets and about the plurality of discrete resin blocks. The system also includes one or more hardware components that attach the decorative resin panel to a support structure.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
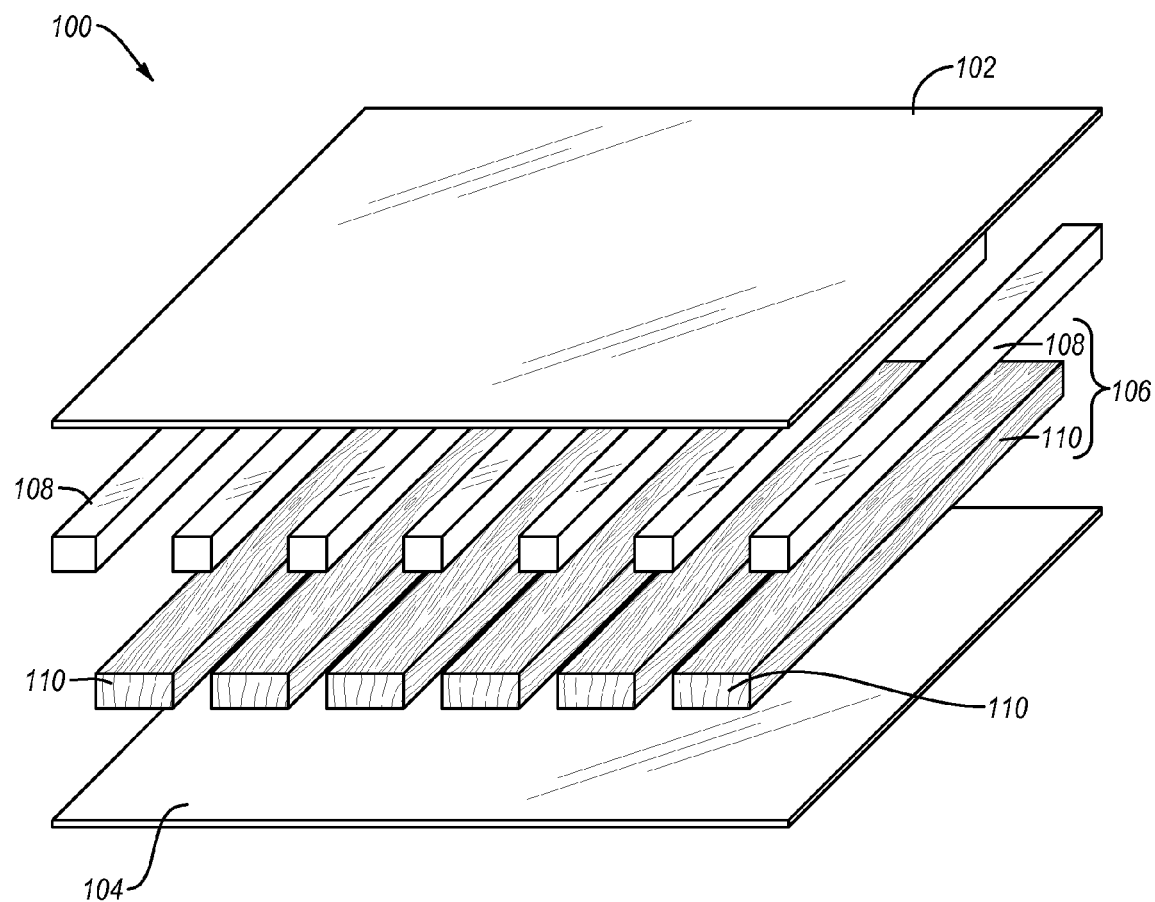
FIG. 1 illustrates an exploded perspective-view of a panel layup assembly for forming a decorative architectural resin panel in accordance with one or more implementations of the present invention.

The present invention extends to systems, methods, and apparatus configured to embed three-dimensional objects within decorative resin panels. Specifically, one or more implementations comprise a process for creating resin panels that involves positioning one or more resin blocks, in addition to three-dimensional objects, between resin sheets. Such implementations also applying a combination of heat and pressure to fuse the resin sheets and resin blocks together about the three-dimensional objects. One or more implementations of the present invention thereby allow the manufacturing of resin panels that exhibit superior uniform viewable surfaces and that can incorporate thick three-dimensional objects, whether they are hard, compressible, or brittle.

In general, and as understood more fully herein, the use of resin blocks can allow a manufacturer to relatively easily and quickly form resin panels with three-dimensional objects embedded therein. In particular, the use of resin blocks can allow a manufacturer to form resin panels with three-dimensional decorative objects embedded without having to use multiple step lamination processes. For example, a manufacturer can use a single lamination-step to fuse resin blocks to opposing resin sheets and about three-dimensional decorative objects. One will appreciate that a single lamination step can reduce processing times, reduce power requirements, and otherwise save time and money.

Along similar lines, the use of resin blocks can reduce processing times by eliminating the need for, and the time associated with, a resin sheet melting about a decorative object. In particular, the use of resin blocks can require only that the resin at the interface of the resin blocks and the resin sheet(s) become sufficiently tacky or melted enough to bond to each other. This is in contrast to having a substantial portion of a resin sheet melt or become sufficiently viscous to flow about decorative objects. One will appreciate that melting only the interface of resin sheets and/or blocks can reduce processing times, reduce power requirements, and otherwise save time and money.

In addition to the foregoing, the use of resin blocks can allow for embedding of brittle or compressible decorative objects within a resin panel without deforming the brittle or compressible decorative objects. More specifically, lamination processes often involve the application of pressure, which can cause brittle or compressible decorative objects therein to deform. The use of resin blocks about such brittle or compressible decorative objects can prevent the brittle or compressible decorative objects from experiencing some or all of the pressure associated with lamination. In particular, the resin blocks can absorb some or all of the pressure that would otherwise be applied to the decorative objects. The resin blocks can thereby reduce or eliminate the pressure applied to compressible or brittle decorative objects, preventing the crushing or compression of the decorative objects.

Referring now to the Figures, FIG. 1 illustrates an exploded perspective view of the layers of a panel layup assembly 100 in accordance with an implementation of the present invention. As shown, the panel layup assembly 100 includes a first resin substrate 102 and an opposing, second resin substrate 104. The resin substrates 102, 104 form opposite outer layers of the panel layup assembly 100. As used herein, the terms "resin substrate," "resin sheet," or "resin block" refers to substrates, sheets, or blocks comprising one or more layers formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), poly lactic acid (PLA), or the like. Furthermore, the resin substrates, sheets, or blocks can include other thermoplastic polymers or thermoplastic polymer blends, or combinations and mixtures thereof. In addition, any given resin substrate, sheet, or block can include any number other layers or coatings.

For example, the panel layup assembly 100 shown in FIG. 1 includes two resin substrates 102, 104. One will appreciate, however, that the panel layup assembly 100 can alternatively comprise multiple resin-based substrates of the same or different materials. The size (i.e., surface area) of the resin substrates 102, 104 can also be any appropriate size for the resulting size of the final decorative architectural resin panel. In at least one implementation, for example, the resin substrates 102, 104 can be about four feet by about eight feet (4'×8'), about four feet by about ten feet (4'×10'), about six feet by about fifteen feet (6'×15'), or taller/wider. Or alternatively, the resin substrates 102, 104 can be about six inches by about six inches (6"×6") or shorter/skinnier. Thus, the size of the resin substrates 102, 104 can vary depending upon the desired dimensions of a final decorative architectural resin panel.

In one or more implementations, at least one of the resin substrates (102 and/or 104) preferably comprises a substantially transparent resin material, thereby providing a view of a decorative interlayer 106 positioned between the first and second resin substrates 102, 104. The decorative interlayer 106 comprises a plurality of discrete or independent resin blocks or portions 108. The decorative interlayer 106 additionally includes a plurality of discrete or independent decorative objects 110.

As discussed above, the resin blocks 108 can comprise any of the various resin materials described above. In one or more implementations, the resin blocks 108 and the resin substrates 102, 104 comprise the same resin material. In alternative implementations, the resin material of the resin blocks 108 differs from the resin material of the resin substrates 102, 104. In particular, as described in greater detail below, in one or more implementations the resin material of the resin blocks 108 can have a lower glass transition temperature than the resin material of the resin substrates 102, 104.

Furthermore, the resin blocks 108 can be colored, transparent, translucent, or opaque as desired to change the aesthetic of the panel. Similarly, the resin sheets 102, 104 can be colored, transparent, translucent, or opaque as desired to change the aesthetic of the panel. In one or more implementations the resin blocks 108 and resin sheets 102, 104 can have the same aesthetic attributes so they are difficult or impossible to distinguish in a finished panel. In further implementations, the resin blocks 108 can have different aesthetic attributes from the resin sheets 102, 104. Furthermore, in one or more implementations the resin blocks 108 incorporate decorative objects such as geometric shapes, rings, patterns, arches, metal hardware, flattened leaves, ferns, cutout designs, fabrics, beans, thatch, willow reed, straw, coffee beans, twigs, bamboo, and so forth. While the decorative objects 110 and resin blocks 108 are shown in an alternating pattern, any combination of one or more decorative objects 110 and one or more appropriately shaped resin blocks 108 is possible, whether uniform, repeating or otherwise.

It will be appreciated that while the decorative objects 110 of FIG. 1 comprise wood slats 110, the decorative objects 110 can include any of a broad range of decorative objects to include, among other things, stone, metal, bamboo, plastics, or combinations thereof. The foregoing list, however, is not intended to be exhaustive, but merely illustrative of the type of materials that can be used in accordance with the present invention.

As used herein, a "decorative" object shall mean any object that a manufacturer can embed into a thermoplastic resin panel to increased aesthetic qualities thereof. A decorative object may serve purely aesthetic, purely structural, or a combination of aesthetic and structural functions within a thermoplastic resin panel. In one or more implementations, adding the decorative objects may result in an increased aesthetic appeal of the thermoplastic panel. Additionally or alternatively, including the decorative objects in the thermoplastic panel may also result in increased structural strength as well as impact resistance of the thermoplastic panel. Moreover, in one or more implementations, inclusion of the decorative objects may result in increased aesthetic qualities as well as structural strength and impact resistance.

The decorative objects 110 can comprise organic or non-organic objects. For example, the decorative objects can comprise synthetic, manufactured, or naturally-occurring representations of vegetative fruits, flowers, rocks, minerals, crystals, glass, vegetative brush, branches, thatch, grasses, willow reed, or other objects. In at least one implementation, the decorative objects 110 are three-dimensional. In other words, the decorative objects 110 are not substantially flat like paper, films, fabrics, or other substantially two-dimensional objects.

Figure 2A:
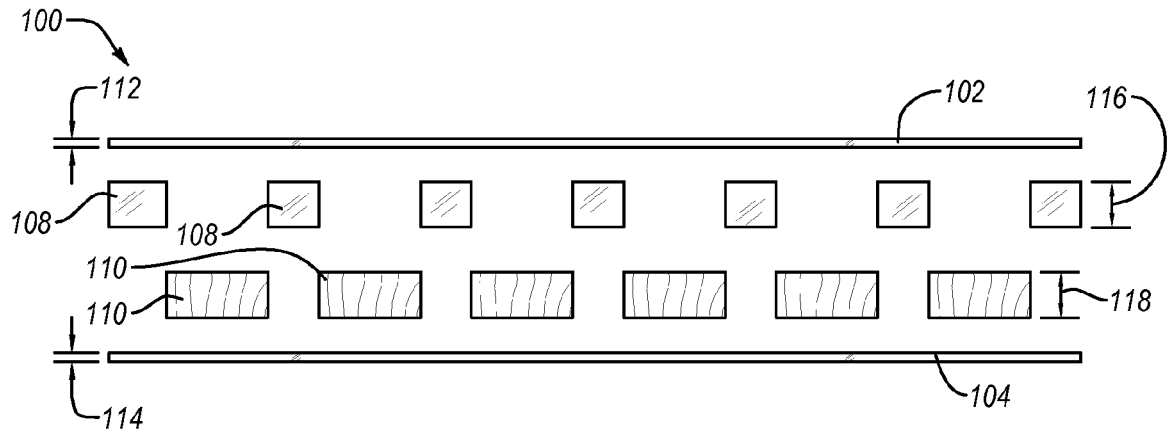
FIG. 2A illustrates an end view of the exploded panel layup assembly of FIG. 1.

Referring now to FIG. 2A, an end view of the panel layup assembly 100 is illustrated. As shown by FIG. 2A, the first resin substrate or sheet 102 can have a thickness or gauge 112. Similarly, the second resin substrate or sheet 104 can have a thickness or gauge 114. The thicknesses 112, 114 of the resin substrates 102, 104 can vary in thickness to include a range from relatively thin gauge films to thicker gauge sheets (e.g., about one-thirty-second inch ($\frac{1}{32}$") or less to about 5 inches (5") or more). For example, in one or more implementations, the thicknesses 112, 114 of the resin substrates 102, 104 can be anywhere from about one-sixteenth inch ($\frac{1}{16}$") to about one-eighth inch ($\frac{1}{8}$") inches. The thicknesses 112, 114 of the resin substrates 102, 104 can be based at least partially on the desired end-use of the resulting panel.

FIG. 2A further illustrates that the resin blocks 108 can have a thickness or gauge 116. Similarly, the decorative objects 110 can have a thickness or gauge 118. In one or more implementations the thickness 116 of the resin blocks 108 is equal to or greater than the thickness 118 of the decorative objects 110. By having resin blocks 108 with a thickness 116 at least as great as the thickness 118 of the decorative objects 110, a manufacturer can ensure that the resin blocks 108 can bond to the resin substrates 102, 104 during lamination. Furthermore, this can reduce or eliminate voids or air entrapment during processing and prevent deformation of the decorative objects 110 as discussed above.

One will appreciate in light of the disclosure herein that in alternative implementations, the thickness 116 of the resin blocks 108 can be less than the thickness 118 of the decorative objects 110. In particular, in such implementations a manufacturer can stack multiple resin blocks 108 on top of each other. During lamination, the stacked resin blocks 108 can fuse or bond to each other and to the resin substrates 102, 104.

In any event, in one or more implementations the decorative objects 110 can have a thickness 118 that is significantly greater than the thickness 112, 114 of the resin substrates 102, 104. For instance, in one or more implementations the decorative objects 110 can have a thickness 118 at least twice as thick as the resin sheets 102, 104. Alternatively, the decorative objects 110 can have a thickness 118 less than the thickness 112, 114 of the resin sheets 102, 104.

As shown by FIG. 2A, the manufacturer can form the panel layup assembly 100 by laying out a plurality of decorative objects 110 on a resin sheet 104. The manufacturer and then place a plurality of resin blocks 108 about the decorative objects 110. The manufacturer can then position another resin sheet 102 on the resin blocks 108 and decorative objects 110.

Figure 2B:
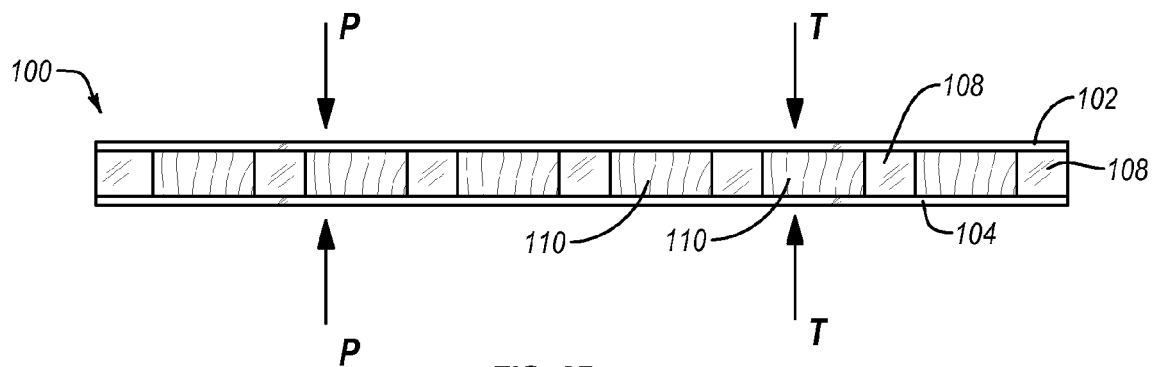
FIG. 2B illustrates an assembled end-view of the panel layup assembly of FIG. 1 with heat and pressure being applied thereto in accordance with one or more implementations of the present invention.

Upon preparing the panel layup assembly 100, the manufacturer then applies appropriate temperature T and pressure P as shown by FIG. 2B. In at least one implementation, the manufacturer applies enough heat and pressure to cause the one or more resin substrates 102, 104 and/or resin blocks 108 to soften or melt. In particular, the temperature T and pressure P causes a first side of each resin block 108 to fuse to the first resin sheet 102. Similarly, the temperature T and pressure P causes a second opposing side of each resin block 108 to the second resin sheet 104.

The temperature T and pressure P can be sufficient to avoid causing any deformation in the outer surfaces of the resin substrates 102, 104. In at least one implementation, the processing temperature T is between about 180° F. and about 370°F. In any event, the processing temperature T is at least as great a glass transition temperature of the resin blocks 108 and/or the resin substrates 102, 104 so as to soften or at least partially melt the resin blocks 108 and/or the resin substrates 102, 104. One will appreciate that varying resins can have a wide range of glass transition temperatures, and thus, the processing temperature can vary depending on which resins are used.

Further, the optimal temperature for bonding may vary depending on the thickness of the resin substrates 102, 104 used, the thickness of the decorative objects 110, and the thickness of the resin blocks 108. The previously described temperatures are each, nevertheless, only an approximate value existing within a range of ±approximately 15°-20° F. As such, a manufacturer need not ensure that the temperatures and pressures of a given process reach the previously described pressures and temperatures exactly. In particular, the manufacturer need only ensure that the temperatures and pressures of a given process are in a suitable range for softening and melting the respective extruded sheet materials and/or resin blocks 108.

For example, in an implementation using co-polyester (e.g., PETG, PET, and PCTG) resin substrates 102, 104 and blocks 108, the appropriate processing temperature may be between about 180° F. to about 275° F. Alternatively, when using acrylic (e.g., PMMA) resin substrates 102, 104 and blocks 108, the appropriate processing temperature may be between about 190° F. to about 360° F., depending largely on the applied pressure. For example, in at least one implementation, the manufacturer can implement a processing pressure P that is between approximately 5 pounds per square inch (psi) and approximately 250 psi, and preferably between about 5 psi and about 160 psi for each such material. In at least one implementation, the appropriate pressure can be about 15, psi, about 40 psi, about 90 psi, or about 120 psi.

In one or more implementations, the processing pressure P is greater than a deformation pressure of the one or more decorative objects 110. As used herein, the deformation pressure of a decorative object 110 is the pressure at which the decorative object permanently deforms (cracks, spits, flattens, etc.) to a visible degree. In one or more implementations, the decorative objects 110 remain un-deformed after the panel layup assembly 100 is subjected to a processing pressure P greater than the deformation pressure. In particular, the resin blocks 108 absorb or prevent at least a portion of the processing pressure P from acting on the decorative objects 110. Thus, one or more implementations can not only prevent deformation to brittle or compressible decorative objects 110, but do so in a single, efficient lamination step.

In any event, the manufacturer can hold the panel layup assembly 100 at the appropriate temperature and pressure until the resin blocks 108 fuse or bond to the resin substrates 102, 104, such as for about 0.1 minutes to about 4 hours. One will appreciate that a manufacturer can apply the processing temperature(s) T and pressure(s) P to the panel layup assembly 100 in any number of different apparatus. For example, the manufacturer can place the panel layup assembly 100 within a thermosetting press. In general, the thermosetting press can include upper and lower platens configured to provide direct heat and pressure to both opposing sides of the given panel layup assembly 100. Heated mechanical press lamination methods include, but are not limited to, hot steam, electric heat, hot oil heated and other methods.

In addition to the foregoing, implementations of the present invention further include using an autoclave to apply the processing temperature(s) T and pressure(s) P. For example, the manufacturer can place the panel layup assembly 100 into a vacuum bag. The manufacturer can then seal the edges of the vacuum bag, and remove air from the vacuum bag. The manufacturer can then place the vacuum bag within the autoclave, which applies equal heat and pressure in all directions on the panel layup assembly 100. In general, an autoclave can heat the panel layup assembly 100 (e.g., via a convection process, rather than via conduction as with a mechanical press) with a controlled temperature profile.

One will appreciate that the autoclaving process can provide a number of additional benefits for creating an appropriate, aesthetically pleasing, resin panel. For example, autoclaving is typically not constrained to one size/format (i.e., an autoclave can process a 2'×4' piece at the same time as an 8'×10' piece). In addition, in the autoclaving process, pressure can be continuous throughout heating and cooling cycles. This continuous pressure can keep the panel layup assembly 100 flat throughout the heating and cooling cycles, which can eliminate bowing. Further along these lines, autoclaving is a convective heating process that allows for more controlled heating and cooling at each direction about the sublimation assembly, and thus allows for equal temperatures at the same depth throughout each corresponding substrate's thickness. Again, since the temperature and pressure, is uniformly distributed throughout each substrate, the autoclave can process multiple different panel layup assembly 100 without any warping/bowing, etc.

In addition to an autoclave process, yet another implementation for heating and pressurizing a panel layup assembly 100 can include use of a vacuum press. In particular and as previously mentioned with respect to the autoclave process, a manufacturer can prepare a vacuum bag with a panel layup assembly 100 therein. The manufacturer can then position the vacuum bag into a vacuum press, and apply the appropriate processing temperatures and pressures. In another implementation, a manufacturer can place a panel layup assembly 100 (without a vacuum bag) in a vacuum press chamber, where air is evacuated prior to application of mechanical pressure.

One will appreciate that the temperatures and pressures for laminating with a heated mechanical press, autoclave, or other thermosetting environment can be dependent on the resins that the substrates and interlayers are produced from and whether or not adhesives are utilized to construct the panel. In any event, in one or more implementations the lamination process of the panel layup assembly 100 can comprise a single step. In other words, the manufacturer can apply a temperature T and pressure P to the panel layup assembly 100 without having to heat the panel layup assembly 100 in multiple steps to soften the resin. As discussed above, this can provide a more efficient manufacturing process.

In addition to the foregoing, in one or more implementations the manufacturer may select resin blocks 108 having a lower glass transition temperature than the resin substrates 102, 104. For example, the resin blocks 108 can comprise co-polyester while the resin substrates 102, 104 comprise polycarbonate. Alternatively, the resin blocks 108 and the resin substrates can comprise different co-polyesters with different glass transition temperatures. Thus, the manufacturer can heat the panel layup assembly 100 to a processing temperature sufficient to soften or at least partially melt the resin blocks 108, but not high enough to soften or melt the resin substrates 102, 104. Thus, the manufacturer can heat the panel layup assembly to a processing temperature T at least as great as the glass transition temperature of the resin blocks 108, but below the melt or glass transition temperature of the resin substrates 102, 104.

In such implementations, the resin substrates 102, 104 do not deform in any appreciable way since the above-mentioned temperatures do not elevate the materials of the resin substrates 102, 104 to their melt or glass transition temperature. Thus, the manufacturer can prevent or reduce warping or dimpling of the resin substrates 102, 104 even when they have a small thickness. As such, one or more implementations of the present invention can create panels with planar and uniform outer surfaces.

In any event, following the application of heat and pressure, the manufacturer can allow the laminated/fused panel layup assembly 100 to cool below the glass transition temperature of the resin material while holding the panel assembly rigid. For instance, the manufacturer can reduce the temperature of the panel layup assembly 100 to between about 50° F. about 120° F., and hold the panel assembly at a pressure of between about 1 psi and about 120 psi. Once the panel layup assembly 100 cools below the glass transition temperature, the manufacturer can remove the decorative resin panel 120 as shown in FIG. 2C from the pressing mechanism.

Figure 2C:
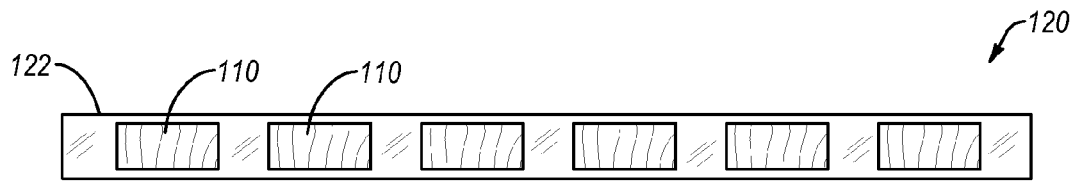
FIG. 2C illustrates an end view of a decorative architectural resin panel formed by applying heat and pressure to the panel layup assembly of FIG. 2B.

As shown by comparing FIG. 2B and FIG. 2C, in one or implementations the resin blocks 108 and resin substrates 102, 104 can sufficiently melt and bond together to form the resin 122 of the decorative resin panel 120. In one or more implementations, the resin blocks 108 and resin substrates 102, 104 may be indiscernible in the decorative resin panel 120. In particular, the decorative objects 110 can appear suspended in a unitary resin 122 encasing. Fusing the resin substrates 102, 104 to the resin blocks 108 to form a unitary decorative resin panel 120 can provide a strong panel that resists or eliminates delamination. This is despite the large size and number of decorative objects 110.

Figure 3A:
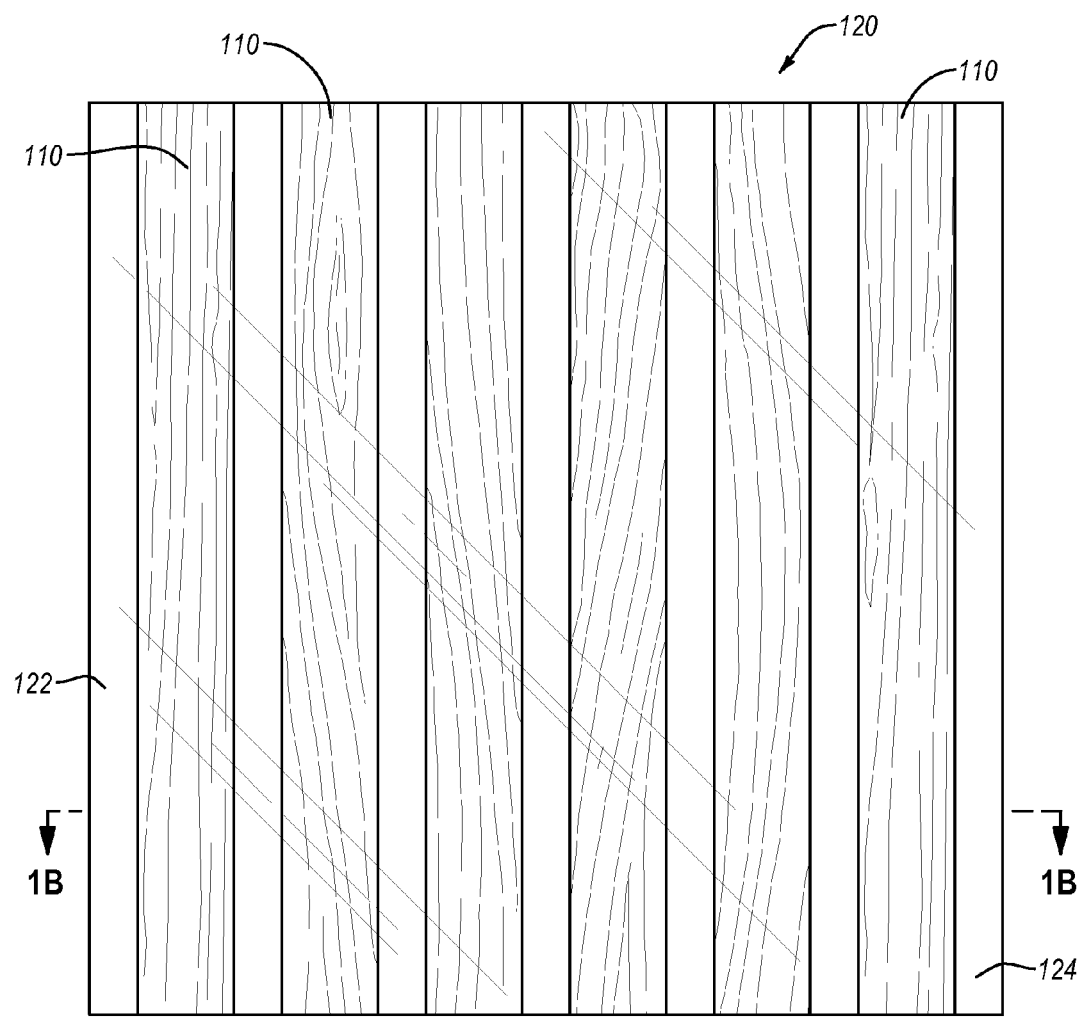
FIG. 3A illustrates a front view of the decorative architectural resin panel of FIG. 2C.
Figure 3B:
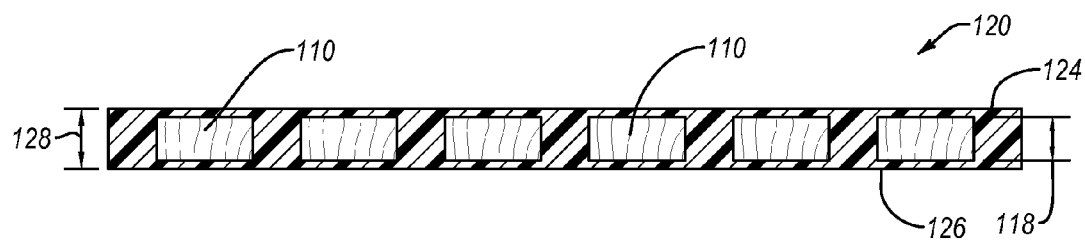
FIG. 3B illustrates a cross-sectional view of the decorative architectural resin panel of FIG. 3A taken along the line 3B-3B of FIG. 3A.

FIGS. 3A and 3B illustrate top and cross-sectional views of the decorative resin panel 120. As shown, the decorative objects 110 can provide the decorative resin panel 120 with a pleasing aesthetic. In one or more implementations, the decorative objects 110 (wood slats in the implementation shown in FIG. 3A) can span the entire length of the decorative resin panel 120. In alternative implementation, the decorative objects 110 span only a portion of the length of the decorative resin panel 120.

FIG. 3A illustrates that the decorative objects 110 are parallel to the side edges of the decorative resin panel 120. One will appreciate that the present invention is not so limited, in alternative implementations the decorative objects 110 can extend parallel to the top and bottom edges. In still further implementations the decorative objects can be angled relative to the edges of the decorative resin panel 120.

FIG. 3B illustrates that the decorative resin panel 120 can comprise opposing outer top and bottom surfaces 124, 126. In one or more implementations, the decorative objects 110 are viewable through each of the top and bottom surfaces 124, 126. In alternative implementations, one or more of the top and bottom surfaces 124, 126 can is opaque and thereby prevents viewing of the decorative objects 110 therethrough. As shown by FIG. 3B, in one or more implementations the outer surfaces 124, 126 of the decorative resin panel 120 are flat, smooth, and un-deformed (i.e., no dimples or waves).

The decorative resin panel 120 can further comprise a thickness or gauge 128 between the top surface 124 and the bottom surface 126. As shown by FIG. 3B, in one or more implementations the thickness 118 of the decorative objects 110 is approximately half or more of the total thickness 128 of the decorative resin panel 120. More specifically, in one or more implementations the thickness 118 of the decorative objects 110 is approximately 60%, 65%, 75%, 80%, or even 85% of the total thickness 128 of the decorative resin panel 120. Thus, the use of resin blocks 108 can allow the use of thinner resin sheets 102, 104, which in turn allows the decorative objects 110 to be closer to the outer surfaces 124, 126 of a finished decorative resin panel 120.

In addition, because the resin blocks 108 substantially fill any gaps between the decorative objects 110, the manufacturer can reduce the thickness of the resin substrates 102, 104. Reducing the thickness of the resin substrates 102, 104 can both reduce manufacturing cost, and also provide an enhanced aesthetic, inasmuch as thinner resin sheets provide closer view of the decorative objects 110 than would otherwise be possible. The resin substrates 102, 104 can be as thin as about 1/32 of an inch, but are preferably at least about 1/16 of an inch.

Figure 4A:
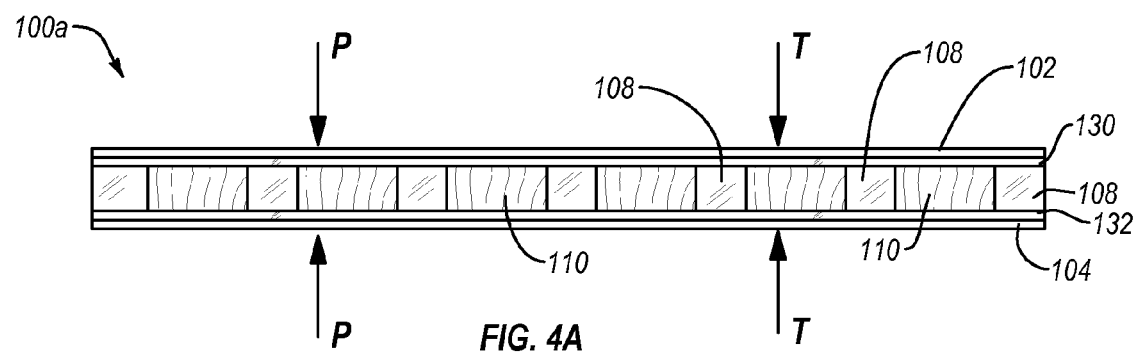
FIG. 4A illustrates an assembled end-view of another implementation of a panel layup assembly in accordance with one or more implementations of the present invention.

Additionally, the panel layup assembly can also optionally include one or more adhesive layers. For example, FIG. 4A illustrate another implementation of a panel layup assembly 100a. The panel layup assembly 100a is similar to the panel layup assembly 100 shown and described in relation to FIGS. 2-2B, albeit that the panel layup assembly 100a includes adhesive layers 130, 132. In particular, the panel layup assembly 100a includes a first adhesive layer 130 between the first resin substrate 102 and the resin blocks 108. The panel layup assembly 100a further optionally includes a second adhesive layer 132 between the second resin substrate 104 and the resin blocks 108.

The adhesive layers 130, 132 can be any appropriate adhesive layer such as a solid film-format ethylene vinyl acetate or "EVA"; ethylene acrylates, such as ethyl methacrylate or "EMA"; polyvinyl butyral or "PVB"; or any thermoplastic polyurethane (TPU) of aliphatic or aromatic construct capable of adhering opposing resin sheets together with applied heat. Still further adhesive layers can comprise thermoplastic polyolefins (TPO). One advantage provided by adhesive layer(s) 130, 132 is that bonding can be effectuated more easily in some cases between resin and decorative objects, and at lower temperatures and pressures than typically used without adhesive layers. Furthermore, an adhesive layer, such as EVA, can aid in removing air bubbles efficiently compared with using liquid-based adhesives. Nevertheless, one will appreciate that liquid adhesives may also be appropriate for adhesive layer in some cases. When using adhesives, it may be preferable to apply the adhesive to the decorative objects only.

Figure 4B:
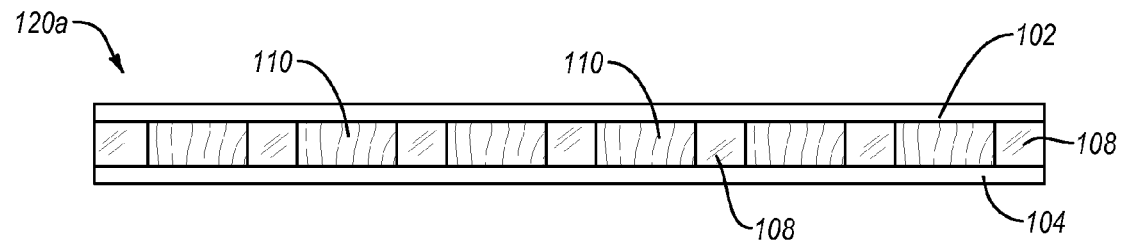
FIG. 4B illustrates an end view of a decorative architectural resin panel formed by applying heat and pressure to the panel layup assembly of FIG. 4A.

As shown by FIG. 4B, the resin substrates 102, 104 can be readily identifiable in a finished decorative resin panel 120a formed with adhesive layers 130, 132. In particular, FIG. 4B illustrates that first and second resin substrates 102, 104 are planar and are separated by a distance defined by a thickness of the decorative objects 110 and the thickness of the adhesive layers. In implementations without adhesive layers, the first and second resin substrates 102, 104 are planar and are separated by a distance defined by a thickness of the decorative objects 110 alone. Additionally or alternatively, a manufacturer can include one or more colored films or fabrics in the panel layup assembly 100, 100a. Such films and fabrics can provide additional desired aesthetics to the finished decorative resin panel.

Figure 5A:
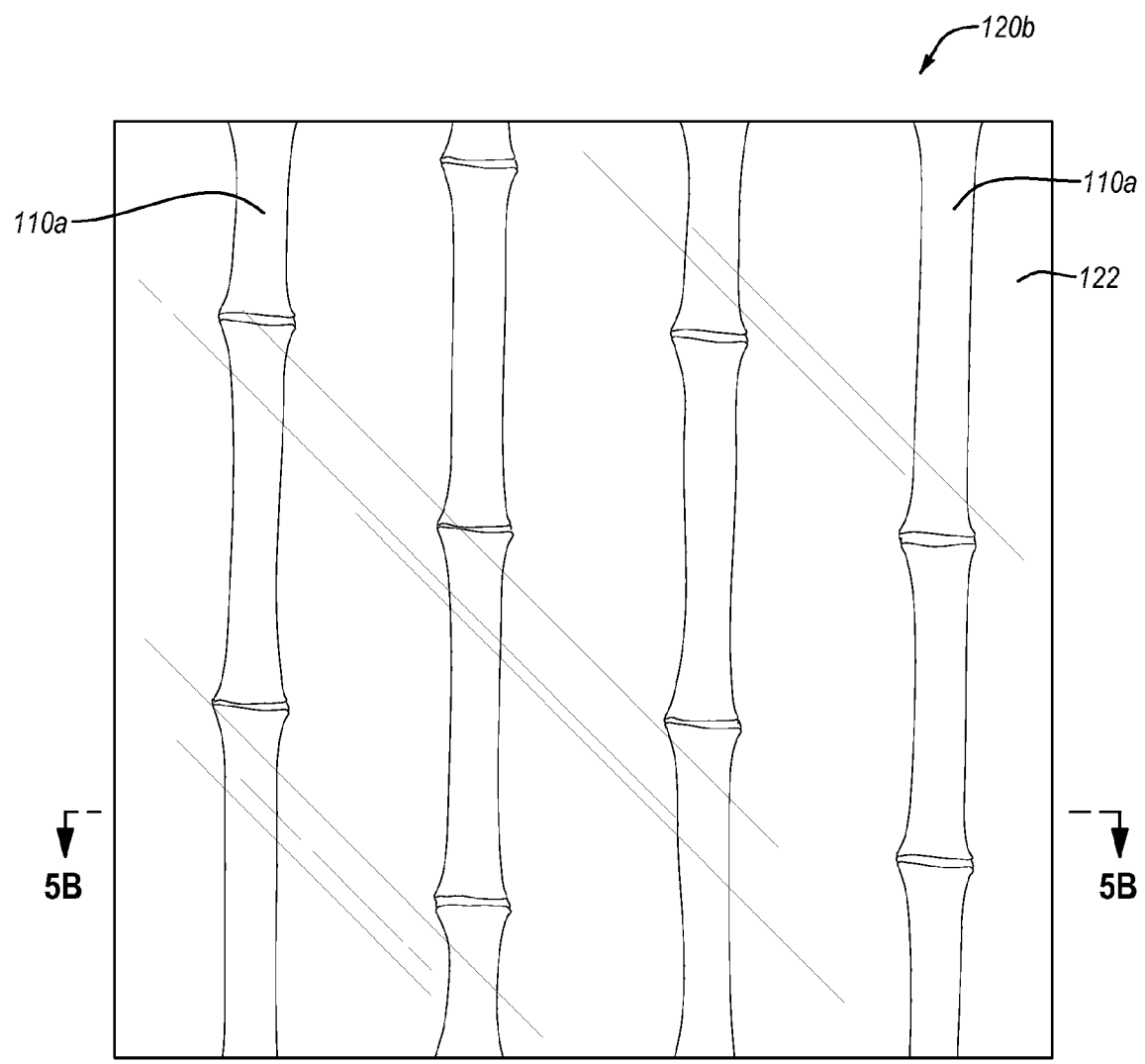
FIG. 5A illustrates a front view of another decorative architectural resin panel that incorporates three-dimensional objects in accordance with one or more implementations of the present invention.
Figure 5B:
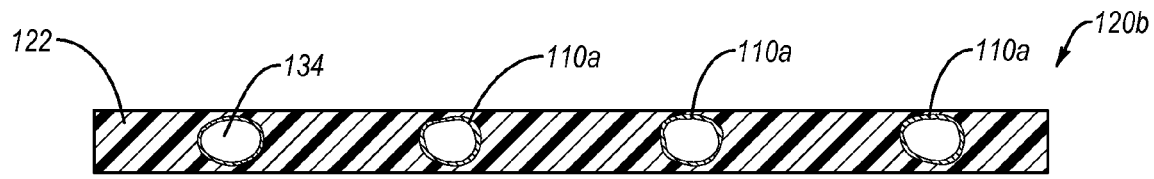
FIG. 5B illustrates a cross-sectional view of the decorative architectural resin panel of FIG. 5A taken along the line 5B-5B of FIG. 5A.

Referring now to FIGS. 5A and 5B, another decorative resin panel 120c formed using resin blocks 108 is illustrated. In contrast to the decorative resin panel 120, the decorative resin panel 120b includes brittle or compressible decorative objects. In particular, the decorative objects 110a comprise bamboo shoots. The bamboo shoots include a hollow center 134. In one or more implementations, the use of the resin blocks 108 can prevent from compressible decorative objects 110a from cracking or otherwise deforming during the lamination process.

In particular, as alluded to above, the use of resin blocks having a thickness at least as great as the thickness of the decorative objects 110a can prevent the decorative objects 110a from experiencing some or all of the pressure associated with lamination. In particular, the resin blocks can absorb some or all of the pressure that would otherwise be applied to the decorative objects 110a. The resin blocks can thereby reduce or eliminate the pressure applied to compressible or brittle decorative objects 110a, preventing the crushing or compression of the decorative objects.

In addition to the forgoing, in one or more implementations the resin blocks 108 can have a thickness greater than the thickness of the decorative objects 110a. The increased thickness of the resin blocks can provide additional resin that can flow about non-uniform decorative objects 110a. This can ensure a finished decorative resin panel 120b that is devoid of air pockets or bubbles around the exterior of the decorative objects 110a.

The resin blocks 108 can thus expand the variety of three-dimensional decorative objects 110, 110a used in resin panels, while enabling a single-step lamination process. At times, it may also be appropriate to incorporate resin material within the decorative objects themselves. For instance, when using bamboo as a decorative object, a manufacturer may add resin material within the bamboo to provide even additional support to prevent crushing during the lamination process.

Figure 6A:
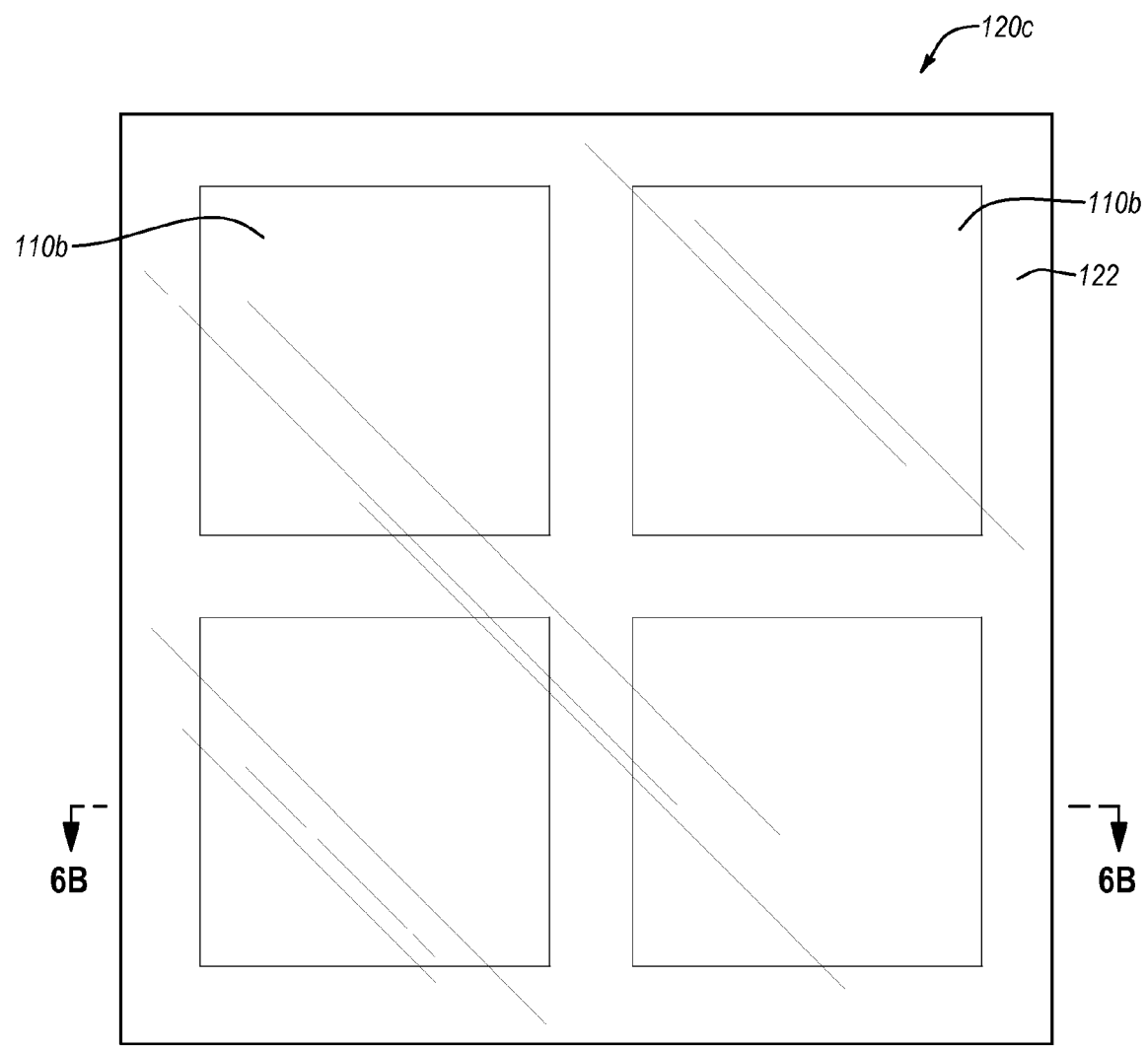
FIG. 6A illustrates a front view of yet another decorative architectural resin panel that incorporates three-dimensional objects in accordance with one or more implementations of the present invention.
Figure 6B:
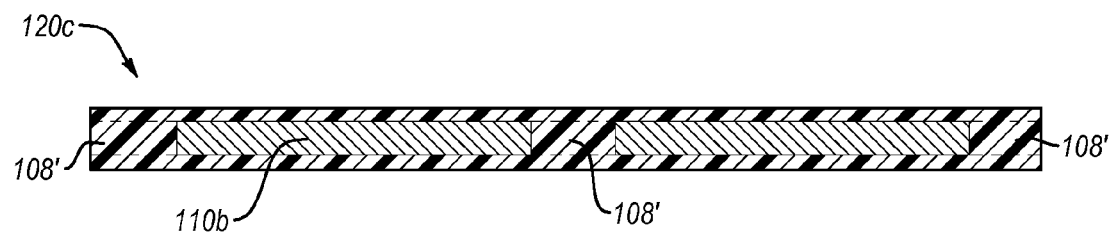
FIG. 6B illustrates a cross-sectional view of the decorative architectural resin panel of FIG. 6A taken along the line 6B-6B of FIG. 6A.

FIGS. 1-5B illustrate or infer elongated decorative objects and resin blocks. One will appreciate in light of the disclosure herein that the present invention is not so limited. Indeed, the decorative objects and resin blocks can comprise any number of different shapes, sizes, and configurations. For example, FIGS. 6A-6B illustrate square decorative objects 110b. The decorative objects 110b can comprise stone, glass, ceramic, or metal tiles.

One will appreciate that the resin blocks used to form the decorative resin panel 120c can comprise resin blocks positioned length wise and width wise about the decorative objects 110b. In alternative implementations, the resin blocks can comprise a grid or other configuration. Thus, the resin blocks need not be discrete. FIG. 6B illustrates that in one or more implementations the resin blocks 108' may be visually distinguishable from the resin sheets after the lamination process.

Figure 7:
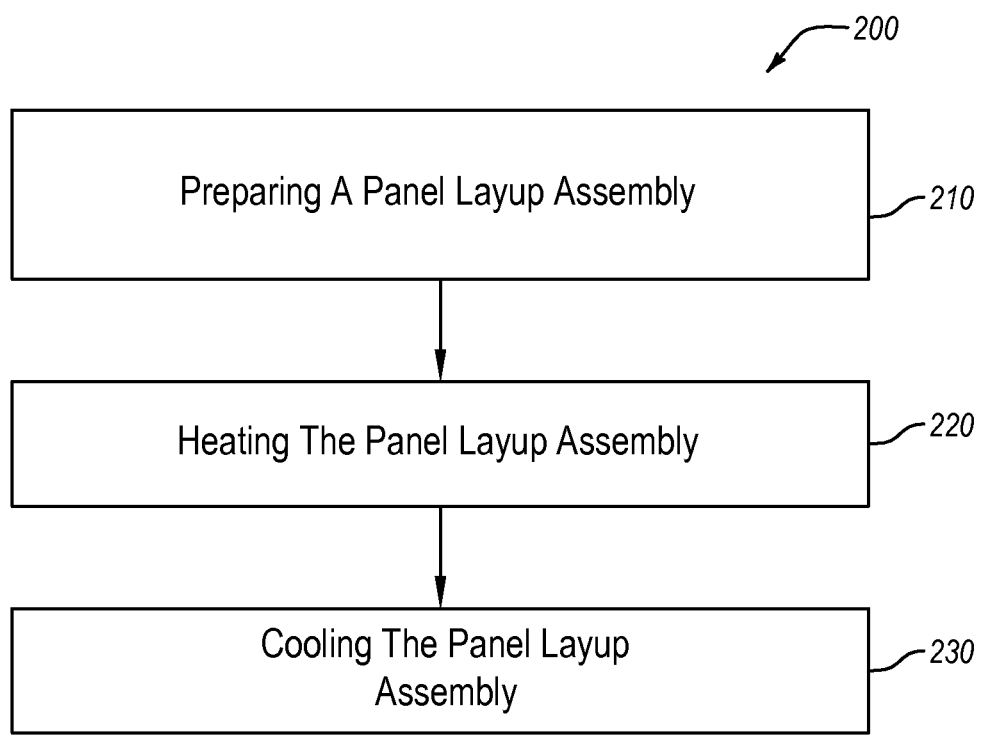
FIG. 7 illustrates a chart of acts and steps in a method of forming decorative resin panels that incorporate three-dimensional objects in accordance with one or more implementations of the present invention.

Accordingly, FIGS. 1-6B, the corresponding text, and the examples, provide a number of different components and mechanisms for creating decorative resin panels with relatively large embedded decorative objects in a single lamination step. In addition to the foregoing, implementations of the present invention can also be described in terms of flowcharts comprising acts and steps in a method for accomplishing a particular result. For example, FIG. 7 illustrates a flowchart of one exemplary method for manufacturing a decorative resin panels with relatively large embedded decorative objects. The acts of FIG. 7 are described below with reference to the components and diagrams of FIGS. 1 through 6B.

For example, FIG. 7 shows that the method of 200 manufacturing decorative resin panels with relatively large embedded decorative objects can comprise an act 210 of preparing a panel layup assembly. Act 210 can include forming a panel layup assembly 100, 100a for the forming a decorative resin panel 120, 120a, 120b, 120c. For example, as illustrated in FIGS. 1, 2A, and 2B, a manufacturer can form a panel layup assembly 100 by positioning one or more three-dimensional decorative objects 110, 110a, 110b between a first resin sheet 102 and a second resin sheet 104. Act 210 can further involve positioning a plurality of resin blocks 108 between the first resin sheet 102 and the second resin sheet 104 and about the one or more three-dimensional decorative objects 110. The plurality of resin blocks 108 can have a thickness 116 at least as thick as a thickness 118 of the plurality of three-dimensional objects 110.

Although not shown, a manufacturer can also perform an act of positioning one or more adhesive layers in the panel layup assembly 100, 110a. In particular, the act 210 may include positioning one or more adhesive layers 130, 132 between one or both of the plurality of resin blocks 108 or decorative objects 110 and the first resin substrate 102 and/or second resin substrate 104. These layers can, in one more implementations, create channels (i.e., texture) along which air may travel to escape during lamination.

Also not shown, the manufacturer may position one or more decorative layers (i.e., films or fabrics) against one or both of the first resin substrate 102 and/or the second resin substrate 104. In this way, the manufacturer can add additional color and/or texture to the decorative resin panel 120, 120a, 120b, 120c. In one or more implementations, the decorative layers may comprise a film applied to the resin substrate(s).

Furthermore, FIG. 7 further shows the method can comprise an act 220 of heating the panel layup assembly. Act 220 can include applying a combination of heat and pressure to the panel layup assembly until the plurality of resin blocks 108 fuse or bond to the first resin substrate 102 and the second resin substrate 104. In particular, act 220 can comprise heating the panel layup assembly 100, 100a to a processing temperature at least as great a glass transition temperature of the resin blocks 108.

The resin blocks 108 and/or resin substrates 102, 104 can fuse or bond to the decorative objects 110, 110a, 110b. For example a manufacturer can use an autoclave or a mechanical press to raise the temperature and the pressure of the panel layup assembly 100, 110a. The manufacturer can use the autoclave or press to apply a temperature of between about 180° F. and about 400° F. and a pressure of between about 5 psi and about 250 psi for a time period of between about 0.1 minutes and about 20 minutes to the panel assembly. The manufacturer may also make the use a vacuum to lower the air pressure (either before or during pressing) to remove air from the panel assembly.

FIG. 7 also shows that the method comprises act 230 of cooling the layup assembly. Act 230 can include cooling the panel layup assembly 100, 110*a* below the glass transition temperature of the thermoplastic material comprising the resin blocks 108 and/or resin substrates 102, 104. For example, a manufacturer can place the panel layup assembly 100, 100*a* into a cold press or can simply position the panel layup assembly 100, 100*a*, so that ambient air can cool the panel layup assembly 100, 100*a*. Upon cooling, resin blocks 108 and resin substrates 102, 104 can harden and form a mechanical and/or chemical bonds one with another.

Figure 8:
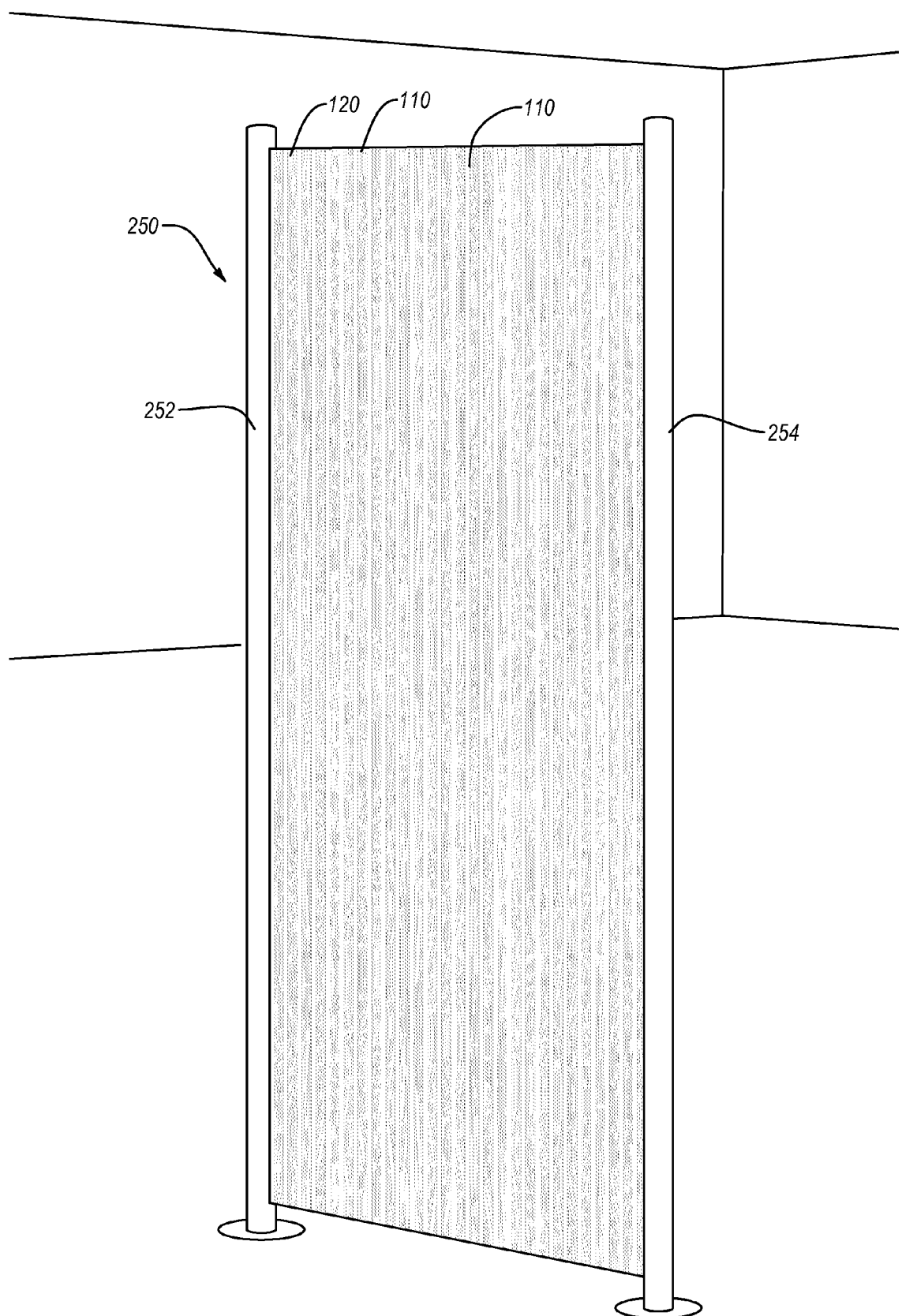
FIG. 8 is schematic view of panel system including a decorative architectural resin panel as a partition in accordance with one or more implementations of the present invention.
Figure 3A:
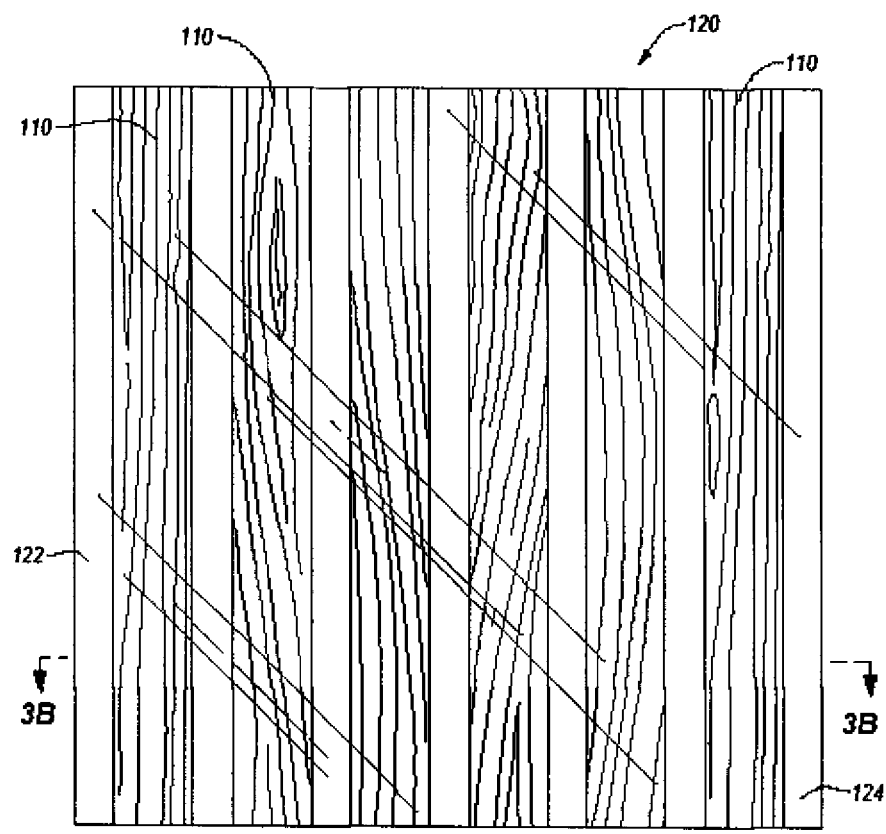

In any event, once formed, an end-user can arrange decorative resin panels with relatively large embedded decorative objects produced as described herein into a panel system. For example, FIG. 8 illustrates a panel system 250 including a decorative resin panel 120 with relatively large embedded decorative object 110 secured to a support structure (i.e., floor) by a plurality of hardware components 252, 254. As shown, the decorative resin panels 120 can include relatively large embedded decorative objects extending across the height of the panel. The decorative resin panel 120 is positioned as a partition. In alternative implementations, the decorative resin panel 120 can comprise a door, window covering, wall treatment, ceiling feature, or the architectural form.

In any event, panel system 250 can add to the functional and/or aesthetic characteristics of a given structure of design space. Thus, one will appreciate that implementations of the present invention provide a manufacturer with a number of ways to prepare a structurally useful, aesthetically desirable decorative resin panels with relatively large embedded decorative objects. These panels can have a wide range of shapes, sizes, thicknesses, properties or colors, and can be used in a wide range of environments and applications.

As discussed herein, the resin panels of the present invention can be preserve the integrity of the decorative objects that could otherwise be ruined or disfigured using conventional thermoforming processes. In particular, the manufacturing methods and apparatus described herein allow for the incorporation of thicker decorative objects, which have highly-desirable aesthetic properties, but at the same time have heretofore been impractical or impossible to incorporate into translucent resin panels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A decorative architectural resin panel, comprising:
   a first resin substrate;
   a second resin substrate;
   a plurality of discrete decorative objects positioned between the first and second resin substrates, and
   a plurality of discrete resin blocks positioned about the decorative objects, the plurality of resin blocks being positioned between and fused to the first resin substrate and the second resin substrate;
   wherein:
      one or more of the decorative objects comprise organic objects; and
      the one or more decorative objects comprise wood slats.

2. The decorative architectural resin panel as recited in claim 1, wherein the first and second resin substrates are planar and are separated by a distance defined by a thickness of the decorative objects.

3. The decorative architectural resin panel as recited in claim 2, wherein a thickness of the decorative objects is approximately half or more of the total thickness of the decorative architectural panel.

4. The decorative architectural resin panel as recited in claim 3, wherein each of the first and second resin substrates have a thickness of ⅛ an inch or 1/16 an inch.

5. The decorative architectural resin panel as recited in claim 1, wherein the first and second resin sheets are transparent.

6. The decorative architectural resin panel as recited in claim 1, wherein the one or more decorative objects are hollow and substantially un-deformed.

7. The decorative architectural resin panel as recited in claim 6, wherein the one or more decorative objects comprise bamboo.

8. The decorative architectural resin panel as recited in claim 1, wherein each resin block is separated from adjacent resin blocks by one or more decorative objects.

9. A panel system, comprising:
   a decorative resin panel, comprising:
      a first resin substrate;
      a second resin substrate;
   a plurality of discrete resin blocks positioned between the first resin substrate and the second resin substrate, wherein:
      a first side of each discrete resin block abuts against and is fused to the first resin substrate;
      a second, opposing side of each discrete resin block abuts against and is fused to the second resin substrate;
      a plurality of three-dimensional objects positioned between the first and second resin substrates and about the plurality of discrete resin blocks; and
      one or more hardware components that attach the decorative resin panel to a support structure;
      the one or more hardware components support the decorative resin panel as a partition.

10. The panel system as recited in claim 9, wherein a plurality of three-dimensional objects extend parallel to an edge of the decorative resin panel.

11. The panel system as recited in claim 9, wherein the first and second resin substrates are planar and are separated by a distance defined by a thickness of the three-dimensional objects.

12. The decorative architectural resin panel as recited in claim 9, wherein a thickness of the three-dimensional objects is approximately half or more of the total thickness of the decorative architectural panel.

13. The decorative architectural resin panel as recited in claim 10, wherein each of the first and second resin substrates has a thickness of ⅛ an inch or 1/16 an inch.

14. The decorative architectural resin panel as recited in claim 11, wherein the first and second resin sheets are transparent.

15. A decorative architectural resin panel, comprising:
   a first resin substrate;
   a second resin substrate;
   a plurality of discrete decorative objects positioned between the first and second resin substrates, and a plurality of discrete resin blocks positioned about the decorative objects, the plurality of resin blocks being positioned between and fused to the first resin substrate and the second resin substrate;

wherein:

the one or more decorative objects are hollow and substantially un-deformed; and the one or more decorative objects comprise bamboo.

16. The decorative architectural resin panel as recited in claim 15, wherein the first and second resin substrates are planar and are separated by a distance defined by a thickness of the decorative objects.

17. The decorative architectural resin panel as recited in claim 16, wherein a thickness of the decorative objects is approximately half or more of the total thickness of the decorative architectural panel.

18. The decorative architectural resin panel as recited in claim 17, wherein each of the first and second resin substrates have a thickness of ⅛ an inch or 1/16 an inch.

19. The decorative architectural resin panel as recited in claim 15, wherein the first and second resin sheets are transparent.

20. The decorative architectural resin panel as recited in claim 15, wherein one or more of the decorative objects comprise organic objects.

21. The decorative architectural resin panel as recited in claim 20, wherein the one or more decorative objects comprise wood slats.

22. The decorative architectural resin panel as recited in claim 15, wherein each resin block is separated from adjacent resin blocks by one or more decorative objects.

23. A decorative architectural resin panel, comprising:

a first resin substrate;

a second resin substrate;

a plurality of discrete decorative objects positioned between the first and second resin substrates, and a plurality of discrete resin blocks positioned about the decorative objects, the plurality of resin blocks being positioned between and fused to the first resin substrate and the second resin substrate;

wherein:

the first and second resin substrates are planar and are separated by a distance defined by a thickness of the decorative objects, a thickness of the decorative objects is approximately half or more of the total thickness of the decorative architectural panel, each of the first and second resin substrates have a thickness of ⅛ an inch or 1/16 an inch.

24. The decorative architectural resin panel as recited in claim 23, wherein the first and second resin sheets are transparent.

25. The decorative architectural resin panel as recited in claim 23, wherein one or more of the decorative objects comprise organic objects.

26. The decorative architectural resin panel as recited in claim 23, wherein the one or more decorative objects comprise wood slats.

27. The decorative architectural resin panel as recited in claim 23, wherein the one or more decorative objects are hollow and substantially un-deformed.

28. The decorative architectural resin panel as recited in claim 27, wherein the one or more decorative objects comprise bamboo.

29. The decorative architectural resin panel as recited in claim 23, wherein each resin block is separated from adjacent resin blocks by one or more decorative objects.

30. A panel system, comprising:

a decorative resin panel, comprising:

a first resin substrate;

a second resin substrate;

a plurality of discrete resin blocks positioned between the first resin substrate and the second resin substrate, wherein:

a first side of each discrete resin block abuts against and is fused to the first resin substrate;

a second, opposing side of each discrete resin block abuts against and is fused to the second resin substrate;

a plurality of three-dimensional objects positioned between the first and second resin substrates and about the plurality of discrete resin blocks;

one or more hardware components that attach the decorative resin panel to a support structure; and a plurality of three-dimensional objects extend parallel to an edge of the decorative resin panel.

31. The panel system as recited in claim 30, wherein the one or more hardware components support the decorative resin panel as a partition.

32. The panel system as recited in claim 31, wherein the first and second resin substrates are planar and are separated by a distance defined by a thickness of the three-dimensional objects.

33. The decorative architectural resin panel as recited in claim 32, wherein a thickness of the three-dimensional objects is approximately half or more of the total thickness of the decorative architectural panel.

34. The decorative architectural resin panel as recited in claim 33, wherein each of the first and second resin substrates has a thickness of ⅛ an inch or 1/16 an inch.

35. The decorative architectural resin panel as recited in claim 30, wherein the first and second resin sheets are transparent.

* * * * *

UNITED STATES PATENT AND TRADEMARK OFFICE
CERTIFICATE OF CORRECTION

PATENT NO. : 8,968,854 B2
APPLICATION NO. : 13/468633
DATED : March 3, 2015
INVENTOR(S) : Martin et al.

It is certified that error appears in the above-identified patent and that said Letters Patent is hereby corrected as shown below:

Drawings
FIG. 3A, change both occurrences of "1B" to --3B-- see attached page In the Specification
Column 5
Line 12, change "poly lactic" to --polylactic--

Column 10
Line 16, change "is" to --be--
Line 49, change "FIGS. 2-2B" to --FIGS. 2A-2B--

Column 11
Line 22, change "120c" to --120b--

Column 12
Line 37, change "110a" to --100a--
Line 65, change "110a" to --100a--

Column 13
Line 8, change "110a" to --100a--

Signed and Sealed this
Sixteenth Day of February, 2016

Michelle K. Lee
*Director of the United States Patent and Trademark Office*